United States Patent
Firoiu et al.

(10) Patent No.: US 9,596,619 B2
(45) Date of Patent: Mar. 14, 2017

(54) MOBILE INFRASTRUCTURE ASSISTED AD-HOC NETWORK

(71) Applicant: BAE Systems Information and Electronic Systems Integration Inc., Nashua, NH (US)

(72) Inventors: Victor Firoiu, Westford, MA (US); Brian T. Decleene, North Reading, MA (US); May M. Leung, Lexington, MA (US); Soumendra Nanda, Billerica, MA (US); Charles Tao, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 16 days.

(21) Appl. No.: 14/414,459

(22) PCT Filed: Feb. 25, 2014

(86) PCT No.: PCT/US2014/018133
§ 371 (c)(1),
(2) Date: Jan. 13, 2015

(87) PCT Pub. No.: WO2014/175955
PCT Pub. Date: Oct. 30, 2014

(65) Prior Publication Data
US 2015/0172953 A1 Jun. 18, 2015

Related U.S. Application Data (60) Provisional application No. 61/814,879, filed on Apr. 23, 2013.

(51) Int. Cl.
*H04W 28/02* (2009.01)
*H04W 84/18* (2009.01)
(Continued)

(52) U.S. Cl.
CPC ....... *H04W 28/021* (2013.01); *H04L 41/0816* (2013.01); *H04L 41/12* (2013.01); *H04W 40/023* (2013.01); *H04W 84/18* (2013.01)

(58) Field of Classification Search
CPC . H04W 28/021; H04W 84/18; H04W 40/023; H04L 41/0816; H04L 41/12
See application file for complete search history.

(56) References Cited

U.S. PATENT DOCUMENTS 7,006,453 B1 * 2/2006 Ahmed .................. H04L 45/02
370/255
8,509,245 B1 * 8/2013 Kim ...................... H04W 40/28
370/366

(Continued)

FOREIGN PATENT DOCUMENTS

EP 1 511 234 3/2005
EP 1511234 A1 3/2005
(Continued)

OTHER PUBLICATIONS

European Search Report, EP 14788207.0, mailed Nov. 15, 2016, 9 pages.

*Primary Examiner* — Ajay Cattungal
(74) *Attorney, Agent, or Firm* — Daniel J. Long; Sand & Sebolt, LPA; Scott J. Asmus (57) ABSTRACT

A mobile infrastructure assisted ad-hoc network increases the number of nodes capable of being serviced by the network by selectively choosing those protocols for selected nodes which minimize overhead with the freed up bandwidth permitting an increase in the overall number of nodes serviceable by the ad-hoc network to as many as 1,000 nodes. In one embodiment node dynamicity is determining factor as to what protocol will be used.

27 Claims, 8 Drawing Sheets

(51) Int. Cl.
*H04L 12/24* (2006.01)
*H04W 40/02* (2009.01)

(56) References Cited

U.S. PATENT DOCUMENTS

| | | |
|---|---|---|
| 2002/0062388 A1 | 5/2002 | Ogier et al. |
| 2002/0107023 A1 | 8/2002 | Chari et al. |
| 2003/0012176 A1 | 1/2003 | Kondylis et al. |
| 2004/0081166 A1 | 4/2004 | Stanforth et al. |
| 2004/0219909 A1* | 11/2004 | Kennedy ............... H04L 45/14 455/422.1 |
| 2005/0041676 A1* | 2/2005 | Weinstein ............... H04L 45/02 370/401 |
| 2006/0165411 A1* | 7/2006 | Schluter ............... H04J 14/0227 398/33 |
| 2006/0215583 A1* | 9/2006 | Castagnoli ............... H04L 45/02 370/254 |
| 2008/0025270 A1* | 1/2008 | Moon ............... H04W 40/14 370/338 |
| 2008/0189394 A1 | 8/2008 | Ross et al. |
| 2009/0034491 A1* | 2/2009 | Adams ............... H04W 72/1226 370/337 |
| 2009/0059816 A1* | 3/2009 | Reza ............... H04L 45/04 370/256 |
| 2009/0252134 A1 | 10/2009 | Schlicht |
| 2010/0124205 A1 | 5/2010 | Ghanadan et al. |
| 2013/0074127 A1 | 3/2013 | Kotecha et al. |
| 2013/0176960 A1* | 7/2013 | Franklin ............... H04W 72/046 370/329 |
| 2014/0068703 A1* | 3/2014 | Balus ............... H04L 41/0893 726/1 |
| 2015/0111591 A1* | 4/2015 | Hoffberg ............... G06Q 10/0631 455/452.1 |

FOREIGN PATENT DOCUMENTS

| | | |
|---|---|---|
| WO | 01/69862 | 9/2001 |
| WO | 2007015089 | 2/2007 |

* cited by examiner

Choose Protocol for each portion of the Ad Hoc Network based on dynamicity to minimize overhead and maximize goodput/bandwidth utilization for entire Ad Hoc Network to permit scaling for 1000 nodes. —70

Protocol A: Control Routing Transmission, 72
Protocol B: Stateless Flooding Transmission, 74

MOBILE INFRASTRUCTURE ASSISTED AD-HOC NETWORK

RELATED APPLICATIONS

This application claims the benefit of U.S. Provisional Application No. 61/814,879, filed Apr. 23, 2013. This application is herein incorporated by reference in its entirety for all purposes.

FIELD OF THE INVENTION

This invention relates to ad-hoc networks and more particularly to a method and apparatus for dramatically increasing the number of nodes capable of being serviced by the network and for increasing network capacity by selectively choosing either routing or flooding to increase throughput depending on the dynamicity of nodes within the ad-hoc network.

BACKGROUND OF THE INVENTION

Mobile ad-hoc networks, or so-called MANETs, are different from organized or structured networks such as available for the commercial wireless segment.

The mobile ad-hoc nature of the network means that there is no in place infrastructure. Those who want to communicate have radios that could work on a point to point basis if they are in range. The problem is extending the range of the mobile radios by having radios that forward data from one node to the other node in a multi-hop fashion such that the data is repeated from one radio to the other intermediate radios until it reaches the final destination.

For instance if one wishes to send pictures or video one can do so on an ad-hoc basis without prior coordination by using a string of intermediate radios to facilitate end-to-end communication. It will be appreciated that the radios in the ad-hoc network establish a point-to-point communication and do this over network links between nodes. In so doing there is extra logic that enables packets of data to be forwarded depending on where they are to go. Thus, in an ad-hoc network typically this is not a pure broadcast situation. Rather there is a directed point to point movement of packets through a chain of point-to-point moves. Note that when data is transmitted from one node to another one does this in a single hop over a link which is why mobile ad-hoc networks have a link layer so that the communication occurs with one hop between two nodes within range over the corresponding link.

If it is desired to send information to a node that is not within range one invokes the cooperation of other nodes that would store and forward the data so that it gets from one point to an end point. All of the node-to-node linking is controlled with logic that organizes the transmission of the data between a number of radios, each one being referred to as a node within the networking network that cooperate to pass data along beyond the reach of any particular radio.

This multi-hop end-to-end transmission in an ad-hoc network suffers from a number of problems. First and foremost is that the overhead involved in providing so-called link state lists to control the node-node transmissions. This overhead prevents the number of nodes from exceeding a very small number, typically not greater than 30 nodes. Prior ad-hoc networks have operated adequately for tens of nodes. However, a hundred or more nodes stretches the bandwidth of the overall network. The challenge therefore is to be able to scale an ad-hoc network to a thousand or more nodes.

One of the major requirements for ad-hoc networks is in the battlefield where for instance one requires a battalion size communication system in which perhaps there is as many of 1,000 troops each having their own individual radio. In a battalion situation there will be a significant number of participants that want to be able to communicate between themselves, rather than just communicating with small nearby groups of such radios or nodes. As will be seen, the primary impediment to scaling ad-hoc networks up to 1,000 nodes is the massive amount of overhead involved in transmitting link state messages to update all of the radios within the network.

As will be appreciated, the challenge is to be able to cover large number of nodes in wide areas without infrastructure available from commercial cellular networks. In a cellular network where the infrastructure is in place in order to cover more and more nodes in more and more places one simply increases the power or provides more cells and cables in between the towers. The landline or cables between the towers can carry an infinite amount of overhead, at least as compared with the limited bandwidth available for a tactical mobile radios.

Note, in a tactical situation it is time wise not feasible to install all the infrastructure that has to be up and running up front for a large population of radios or users.

Rather than a fixed infrastructure system, when trying to implement an ad-hoc system, one typically prefers a routing system for hop by hop routing of data between network nodes. It is a characteristic of a mobile ad-hoc network that when the network becomes larger and larger on average one needs more hops per unit of data. This is because one wants to communicate not with just immediate neighbors, but with nodes that are on average farther and farther away. Thus one needs to add more and more hops to communicate end-to-end over large distances. In order to implement such a system one needs more and more radios for the same data. However adding nodes to the network becomes more and more expensive in terms of bandwidth such that there are higher and higher levels of data that need to be transmitted for the same unit of data to be delivered to the end destination.

The result is the average throughput through the network decreases as one increases the number of nodes. Thus when one increases the nodes one moves less data because per unit of data one is using more overhead. For instance if it takes a tenth of the time to transmit data on a first hop and a tenth on the second hop and so on, this means that all nodes and links will have less bandwidth for something else. By moving one packet through more and more nodes there is more and more waste of resources. Moreover, the total overhead resources can be used up in an effort to just move one piece of data through a number of nodes. If one overloads the system with too much overhead the result is lost data. This means that as one increases the nodes in the network one has to be content with a less amount of data per unit of time on average through the network. Alternatively, if one wants to push more data through the network one will simply lose more data. Thus there is a tradeoff between the amount of data that needs to be pushed versus the bandwidth associated with the number of nodes necessary to push the data.

For instance in a tactical situation in which one wishes to transmit video data at a medium resolution the data could be streaming video having a bandwidth of 1 megabit per second. On the other hand, the raw bandwidth of a radio transmitting the video could be perhaps 10 megabits per second. Each radio would then utilize 10% of the available raw network bandwidth. Thus for instance one could conceive that on average the video transmission represents a tenth of the capacity of a radio. However if one seeks to transmit the video between 10 nodes, one needs to take 10% of the bandwidth associated with each radio to go to the other side. At 10 hops this means going through 10 nodes to receive and transmit. Thus going through all of the 10 nodes utilizes 100% of the network bandwidth just for overhead.

In actuality each radio in this case would consume 20% of the bandwidth. This is because as one goes hop to hop each radio within range will hear the transmission which occupies 10% of the bandwidth. However each node both transmits and receives so that from a transmission and reception point of view each radio for each hop utilizes 10% to receive and 10% to transmit for a total of 20%. In the above example this means that the total capacity of the network will be reduced by 200%, twice the bandwidth of one radio.

Of course in operation the totality of the bandwidth in the whole network is larger but the point is that each radio uses up a fractional portion of the bandwidth for each radio. Therefore each of the radios on the path will have less capacity to transmit and receive data to and from other radios. It is noted that the more bandwidth that is utilized by the network, the less bandwidth per node on average will be available for instance for future extra video or some other type of communication. Thus the available throughput per node on average will decrease as the size of the network increases.

The commercial solution to such a conundrum is to divide a network into smaller pieces and provide one piece of infrastructure or cellular tower for each small cell. Note that in a cellular system overhead does not contribute to the bandwidth because it is carried over almost unlimited bandwidth optical cable between cell towers.

In short, in a simple ad-hoc network the adding of nodes or radios quickly overwhelms the network with overhead. This is a severe problem which has not been solved up to the present.

Another persistent problem with ad-hoc networks is the need for the ad-hoc network to organize. Ad-hoc networks are not organized in advance. They need to organize by establishing routing or paths or directions for the data to go, any time one wants to send data from one node to another. Routing in general is done through a number of known protocols which specifies how to send the data packets, the most popular of which is the Optimized Link State Routing (OLSR) protocol.

Flooding

A wasteful way to transmit data to a large number of nodes is simply to broadcast the information from one node to another node within range, with the local broadcast called flooding, i.e. flooding the network with the same data.

Flooding however is range limited due to the range of the individual radios. Moreover, flooding is a very wasteful technique because if one has a network of for instance 1,000 nodes every node is going to broadcast and send the data once. Thus for a single packet of data all radios are going to have to send and receive once. Utilizing the flooding is essentially saying that there is N times more waste, where N is the number of hops, thereby using up bandwidth N times more than required.

Flooding definitely works in the sense that it is able to send data from one side of the network to the other without prior organization such as exchanging routing topology but it is exceptionally wasteful in terms of bandwidth. While it is indeed possible to flood all the network nodes, it is an undesirable way of transmitting data because the available capacity of the network is essentially equal only to the capacity of just one radio. Actually it is less than the capacity of just one radio because one radio will have to transmit and receive at the same time. The result is that the overhead is excessive.

It will be appreciated that with flooding one is basically using a totally unorganized network which has the aforementioned mentioned very low efficiency.

Of course if there are no other solutions the flooding system will work but only for a very limited amount of information. However, if the information is critical and small, flooding can be effective.

Routing

Another solution is the so-called routing of the data between the nodes. The routing is accomplished by basically feeding each of the node radios enough information to understand the topology of the network. Every node understands its topology and has enough information to create in its own mind the topology. As a result, it is fairly easy to figure out how to send a packet over the shortest path, and there are very simple algorithms to compute the shortest path. The shortest path algorithms require that each of the nodes understands who is connected to whom. Information that provides the nodes with their location and the shortest path is called the "link state" and this link state is periodically updated based on the distance of one node to the other or for instance the quality of the radio link.

Note the node that is responsible for transmitting basically floods the neighboring nodes with the link state list so that all the nodes can have the same information and make the same decisions as to routing. In this sense the link state list imposes an organization over the ad-hoc network and if each of the nodes is running the same sort of routing algorithm they will reach the same conclusions as to where to send a data packet and what the next hop should be.

The problem with the above routing scenario is that the link state update overhead grows quadratically with the number of nodes in the network. Thus, as the network increases the amount of traffic just to transmit link state updates grows quadratically. As a result, the link state overhead gets bigger and bigger. It will be noted that the link state data is not user data but is rather simply used to organize the network. At some point one reaches full capacity of the network without having even transmitted a single packet of data. While currently there are radios having an ever increasing capacity, the practical limit for such a routing scenario is about 100 nodes.

It will be appreciated that the link state list defines where a node is with respect to another node primarily through measuring signal strength. The link state list is updated with periodic probes to measure neighboring nodes to see if the link is up or not and also the quality of the link.

Additionally, each node must have the same link state information. One needs to have the same information and run the same algorithm to reach the same conclusions on where to route the data. However if the nodes move as for instance in mobile application the link states change and therefore one has to update the link state list more frequently to make sure the information is available in real time. Mobile nodes thus require very frequent link state list updates that can overwhelm the available bandwidth The reason that the network is called a mobile ad-hoc network is that the nodes or radios move. If for instance the nodes do not move or do not move very much then the frequency of updating need not be very high. Thus one can update with a low frequency, i.e. once every 10 seconds which occupies perhaps only 1-2% of the available bandwidth However since a not small number of nodes move all the time one cannot in general rely on a low frequency update. Rather the system defaults to updating at a high frequency which in turn utilizes excessive bandwidth.

A third problem with ad-hoc networks is that network performance is highly dependent on the user topology and operational conditions. In other words there is no one solution or one protocol or algorithm that can provide good performance for all network conditions, namely all user requirements and all operational conditions.

Note that for high priority traffic the best way of transmitting the information is through flooding which as mentioned before is exceptionally wasteful of bandwidth. For this high priority traffic all that is required is to make sure that the traffic gets transmitted to all the nodes on the network. However there is no single solution for mobile applications because of the high range of conditions of the network, the stationary or dynamicity of the mobile unit, and the high variability in traffic requirements.

It is noted that routing and forwarding protocols have been proposed that are particularly good for one particular set of requirements. However there is no single solution that can answer to all of the requirements. What is therefore necessary is a hybrid composite solution made out of several individual existing protocols.

SUMMARY OF INVENTION

Protocol Selection

In order to more adequately manage bandwidth so as to be able to increase the number of nodes in a mobile ad-hoc network, the subject system selects amongst a set of protocols to minimize overhead for selected nodes in the ad-hoc network that can operate with lower bandwidth requirements, with the freed-up bandwidth permitting an increased number of nodes and user data traffic.

In one embodiment, the selection involves identifying node dynamicity so that the system switches between a routing protocol and a flooding protocol depending on what is referred to herein as a dynamicity or physical movement of the nodes. This basically refers to measuring how static or how dynamic the network nodes are within the network.

It will be appreciated that from observation if one has a static network one does not need to utilize very much overhead, meaning that the link list may be propagated around the network much less frequently than if there was a high degree of dynamicity.

Thus for instance if the sensed topology indicates that a relatively static environment exists the system can switch to low frequency link list updates on the order 10 s of seconds as opposed to for instance every other second. In one embodiment, the subject system looks into the networks with an algorithm that tries to identify places within the network where low frequency strategies will work, in other words places where the network is static or has low frequency changes. If one can keep the overhead low then most of the capacity for the network is still available for data so that the data can reach all the nodes in the static or slowly moving environment. Thus in one embodiment, the subject system divides up the network nodes into semi-static or quasi-static areas as opposed to dynamic areas.

As mentioned before a very easy approach to communicating to all the nodes is simply to flood, simply repeating the packages. The flooding as mentioned before utilizes an incredible amount of overhead and part of the key of the subject is to restrict the flooding to those small areas that are exhibiting high dynamics. Thus, in the switching between routing and flooding, flooding is inhibited at the border of the sensed dynamic area.

The result of limiting the flooding is to dramatically decrease the overhead involved in routing in a semi-static environment thus to permit the majority of the bandwidth to be utilized for the transmission of data.

As part of the subject invention is an algorithm called the time initiative algorithm which is the measure of the time duration of a link or how often a link is opened up and then goes down. The simple version of this time initiative algorithm is to look simply at the binary condition of whether the link is up or down. Another way of establishing the time initiative is to detect a series of link qualities and see how it varies. If it varies considerably it means that the link is highly dynamic. Note that one has to go from an observation on each link to a determination of whether a node is static or dynamic.

By way of example if one has a node that only has one link to another node, and moreover that this node may be up or down relative to a neighboring node, if the system further ascertains that all other links to all other nodes are steady, this means that the neighbors on this border are either in a static region or a dynamic region. Then the system has to decide which is which.

In one embodiment, one starts with measurements to measure the dynamicity per link and then by a formula or algorithm to be described hereinafter these measurements are combined per link so that one can make a dynamicity determination per node. Thus, ultimately a node will be judged to be dynamic or static, not a link.

As a result of this measurement if it is ascertained that the nodes are static the system utilizes forwarding and routing protocols to assign the route that one will use for routing meaning the hop by hop routing from this node to a neighbor node. However if the link is rapidly changing and thus the node is too dynamic the system defaults to flooding.

From a higher level understanding of the subject invention the invention involves the combining of existing protocols and selecting between them based on some information that is regional within the net. Thus it is for this aspect the subject invention involves assigning protocols to different nodes. Since the mobile ad-hoc network has many many nodes, the system operates simultaneously using different protocols in different parts of the network, with the protocols individually chosen to be suited for the particular network condition in the particular portion of the network. Thus whether or not there is switching between routing and flooding, broadly in this invention the protocols are switched based on conditions within various portions of the ad-hoc network.

One specific application of this principle is the measuring of the dynamicity of the links and choosing between two particular protocols, namely routing and flooding. While the subject invention will be described in terms of routing and flooding there are other higher level protocols, for instance a protocol called DTN, delay tolerant network protocols, whereas another example of protocols that could be switched in and out are protocols associated with disconnected components that come up and go away. There are also classes of protocols that DTN embodies that actually store the information and delivers the information when the network component comes back and gets back integrating into the larger network.

Specialized Radios

As an overlay to the switching of protocols and more particularly the switching between muting and flooding a specialized radio at a fixed location may be used within the mobile ad-hoc network. These specialized radios are in general long range high power radios that are designed to reach each and every node of a far long network. They may involve directional antennas which may be rotated so that forward gain is swept around a 360 degree area and under certain conditions it is desirable to invoke the specialized radios. This specialized radio functions as an additional node in the network that has a privileged position. It is a more powerful radio with a directional antenna so that it has an exceptionally long range. However it has a limited capacity. If one could add such a specialized radio and if this radio could have effectively unlimited capacity, then the problem is solved because all the hundreds or thousands of nodes will simply communicate with this one special radio in the same way as the cellular network so that communication is a single hop back and forth between the specialized radio and any of the outlying nodes.

However, in practice these radios have a fairly limited capacity and although they are long range it doesn't mean that they can reach every node in the ad-hoc network. Note although the specialized radio reaches a large portion of the nodes in the large mobile ad-hoc network, it does not necessarily have to reach every node because sometimes it is physically not possible as for instance when a node is behind a building or a hill. However, the specialized radio may be utilized for high priority traffic that is important to reach as many nodes as possible. It will be appreciated that for these specialized radios it is likely that every node in the ad-hoc network will discover this radio and once discovered every node will try to communicate with this radio. In this case it is usual that network capacity is quickly reached and that the overall performance of the network will even be worse than it had been before. Thus the specialized radio must be used selectively.

There is however a need to actually organize the use of the specialized radios in an intelligent way to selectively use sparingly this new resource to get maximum benefit out of a small addition to the network.

Thus, with respect to the specialized radio and the selection of same, traffic that would otherwise have been forwarded to the mobile hop by hop system instead would be transmitted through this long range special radio and sent to a specific traffic destination. In one embodiment, the specialized radio is utilized when the transmission of traffic requires a large number of hops. If one wishes to go from one side to the other side of the network sending video, one may for instance have 20 hops from the source destination to the recipient destination. If the situation arises that there are 20 or more hops involved in the transmission of the data packets, then the system switches to the special radio to transmit the large amount of information one way and transmit other traffic requiring a few hops utilizing the routing protocols. Thus, these special long range radios are adapted to be utilized where a large number of hops are involved, whereas multi-hop network protocols are used for small numbers of hops. Thus, the long range radio is utilized where one has a high data throughput which has a long way to go. If one can eliminate the large number of hops in any given situation one has gone a long way to eliminate the wasteful resources of the multi-hop transmission system.

The subject system thus has an algorithm for identifying different network conditions in different parts of the network and based on those identified different conditions selecting specific protocols that are best suited for the particular conditions to minimize overhead. The selection process is also done in a dynamic way in that at different points in time different conditions will occur in the same part of the network. This is done on a real time basis and done on a local regional and global basis meaning that as different parts of the network move or change conditions the algorithm will keep track, adapting by measuring to make decisions to select the protocols and combining them with a goal of optimizing the capacity of the network.

In summary what is provided is a switching protocol system which takes into account the local qualities of portions of the ad-hoc network, switches the protocols to that which is most advantageous and by so doing minimizes the overhead utilized in the network, thus to permit the servicing of large numbers of nodes, sometimes in the thousands.

BRIEF DESCRIPTION OF THE DRAWINGS

These and other features of the subject invention will be better understood in connection with the Detailed Description, in conjunction with the Drawings, of which.

DETAILED DESCRIPTION

The subject system presents a solution to the problem of scaling MANETs beyond 100 nodes while providing service levels compatible to cellular networks. As mentioned hereinbefore traditional or flat MANETs are limited to about 100 nodes due to the high overhead of control traffic and high inefficiency of multi-hop forwarding. While hierarchical networks such as cellular networks scale infinitely they do not provide uniform geographic coverage and require pervasive infrastructure. As described above the subject invention drastically limits the control traffic overhead by identifying operating regimes within the MANET that share common network and application requirements and further involves tailoring data forwarding protocols based on the operating regime. Moreover the subject invention maximizes the benefits of fixed or static wireless radios by selecting to forward over this radio the data and control traffic requiring the most MANET resources such as the longest MANET paths.

By way of further background, tactical networks rely on mobile ad-hoc networks where fixed infrastructure is unavailable. The proliferation of specialized MANET protocols adapted to particular operating conditions, with none of them scaling significantly beyond 100 nodes for all conditions, suggest that no single MANET protocol can support a large scale deployment without significant tailoring.

First, large non hierarchal networks require long average paths between nodes and thus the average goodput in a MANET with uniformly distributed nodes decreases. Most importantly, MANETs are unable to support the accumulated control signaling overhead that occurs in large dynamic networks in which the link state traffic grows quadratically in the number of nodes. A further problem with MANETs is that network performance is highly dependent on user, topology, operational conditions. No single or hybridized solution can accommodate this range of situations. Therefore stable solutions are required that efficiently incorporate multiple MANET algorithms and manage their use in appropriate operational regimes.

Figure 1:
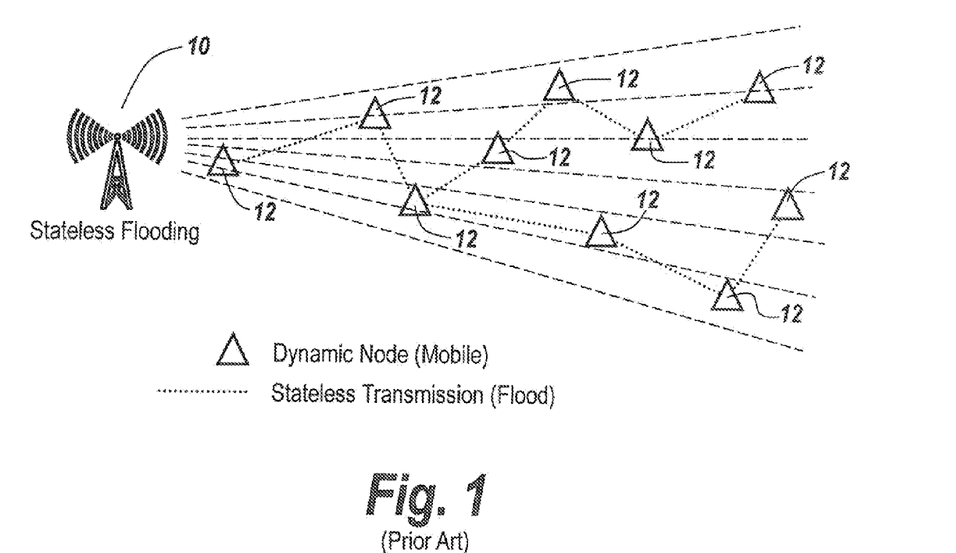
FIG. 1 is a prior art diagram of a prior art system in which stateless flooding is utilized to broadcast to nodes within an ad-hoc mobile network showing the broadcast of data from one node utilizing flooding.

Referring now to FIG. 1, one regime for communicating between all of the nodes in a mobile ad-hoc network is called stateless flooding in which a node 10 broadcasts data to multiple nodes 12 within range of node 10. As mentioned before flooding is useful in certain situations but the stateless transmission or flooding regime is highly inefficient and wasteful of network bandwidth.

Figure 2:
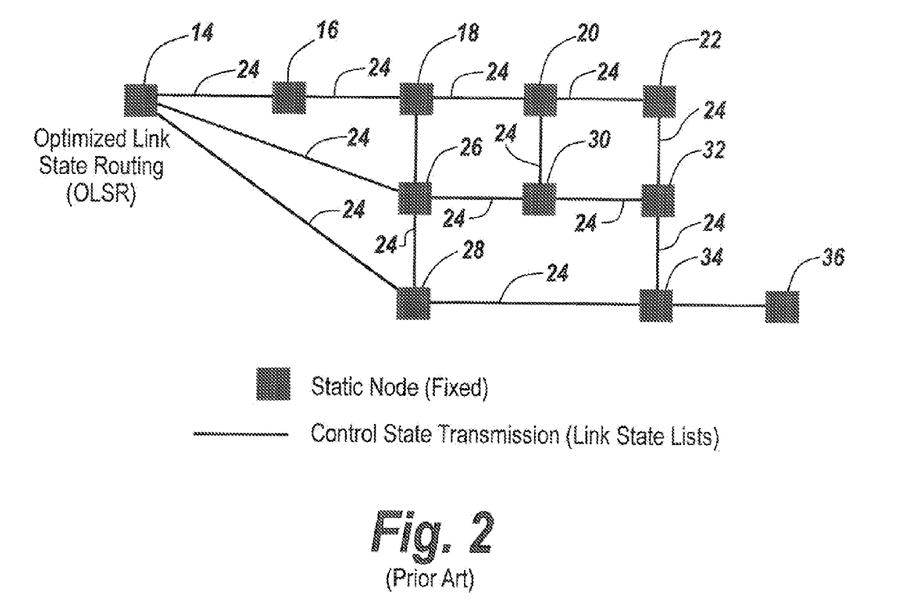
FIG. 2 is a diagrammatic illustration of a prior art optimized link state routing system in which static nodes are utilized and in which communication between the static nodes is governed by control state transmissions involving link state lists in accordance with an optimized link state routing algorithm.

Referring to FIG. 2, a second regime for communicating between the nodes of a mobile ad-hoc network is called routing and includes optimized link state routing or OLSR of information from a node 14 for instance to a node 16 and then to a node 18, 20 and 22 through links 24 that are established utilizing link state updates.

The links also link for instance node 18 to node 26 and thence to 28 or for instance link node 14 through node 26, through node 30, to node 32 and thence perhaps to node 34 which in turn links to node 36. All of these links are controlled by a communications control overhead message provided by the aforementioned link state lists that are used to update all of the nodes in the mobile ad-hoc network.

Figure 3:
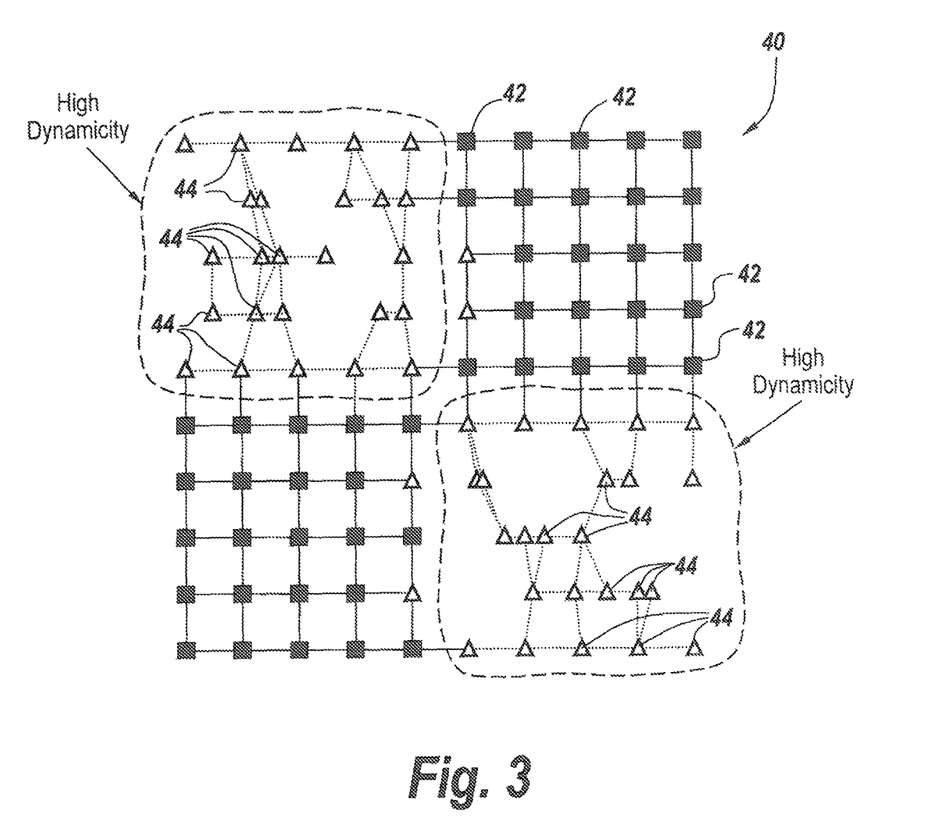
FIG. 3 is a diagrammatic illustration of a mobile ad-hoc network in which various nodes of the network exhibit high dynamicity whereas other nodes exhibit a static or quasi-static state.

Referring to FIG. 3, as described hereinbefore, there are nodes within a mobile ad-hoc network 40 which have one characteristic in that for instance nodes 42 are fixed or do not move very much during a course of a transmission. On the other hand there are nodes 44 which are characterized by high dynamicity meaning that they move significantly during the course of a transmission. It is one purpose of the subject invention to isolate or detect static nodes from high dynamicity nodes and to provide different protocols for the use of these different types of nodes.

Figure 4:
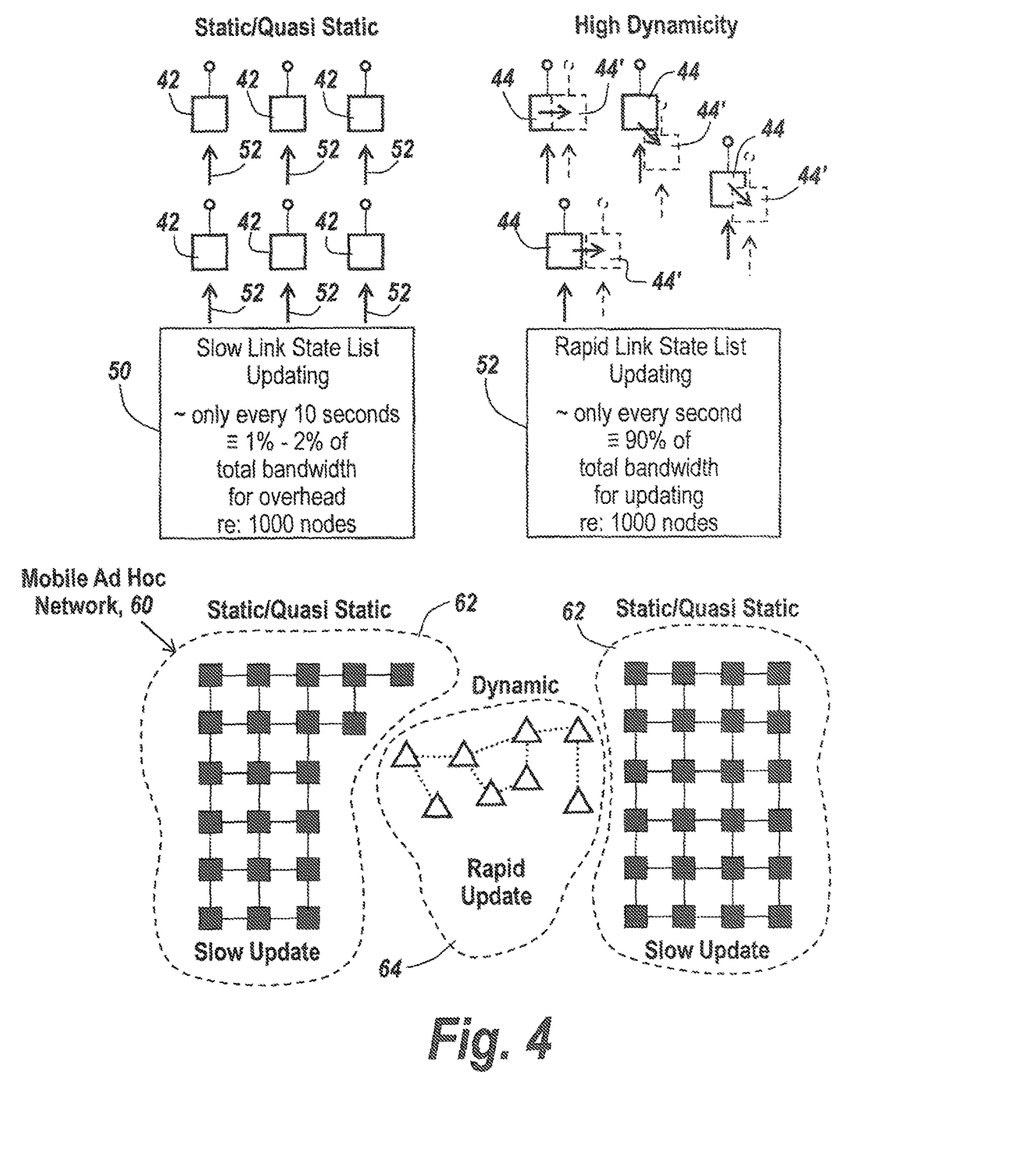
FIG. 4 is a diagrammatic illustration of the covert utilized in transmitting link state lists to static or quasi-static nodes as opposed to those having high dynamicity indicating that static or quasi-static nodes may be addressed utilizing a slow update scenario whereas dynamic nodes may be addressed utilizing relatively rapid updates.

Referring to FIG. 4, one of the ways for selecting particular protocols for different portions of the network requires isolating static or quasi-static nodes from high dynamicity nodes. In this drawing quasi or static nodes are shown by reference character 42 to be updated by a slow link state list updating module 50 which updates these modules as illustrated by arrows 52 to provide control data for instance once every 10 seconds which in the case of 1,000 nodes occupies only 1 to 2 percent of the total bandwidth of the network. The reason that this particular scenario results in only 1 to 2 percent of the total bandwidth of the network is due to the relatively infrequent link state list updates. The result of only having identified static or quasi-static nodes is that one can dramatically increase or scale up the number of nodes in a mobile ad-hoc network.

On the other hand a high dynamicity node shown at 44 actually moves during the use of the network to move to for instance the position shown at 44'. In this case, if link-state routing is desired, a rapid link state list updating module 52 must update the high dynamicity nodes for instance once every second which corresponds to 90 percent of the total bandwidth of the mobile ad-hoc network, assuming 1,000 nodes. It will be appreciated that if the entire mobile ad-hoc was composed of high dynamicity nodes then the overhead would quickly swamp the ability of the remainder of the network to transmit non-controlled data.

As can be seen at the bottom of FIG. 4, the static or quasi-static nodes in a mobile ad-hoc network 60 are those surrounded by dotted line 62 and are those for which a slow update is appropriate.

However there are nodes as illustrated surrounded by dotted line 64 which represent highly mobile or high dynamicity nodes which must be rapidly updated.

Figure 5:
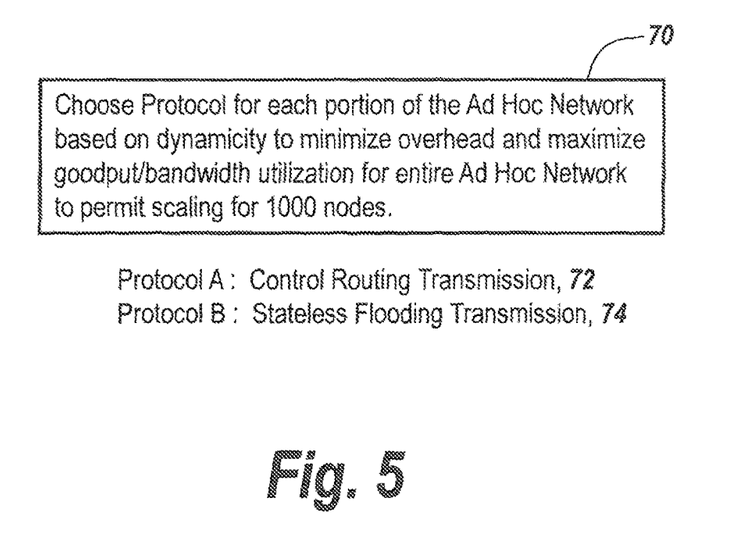
FIG. 5 is a diagrammatic illustration of the choice of a protocol for each portion of an ad-hoc network based on dynamicity to minimize overhead and maximize goodput/bandwidth utilization for the entire ad-hoc network to permit scaling of the ad-hoc network to as many as 1,000 nodes.

Having been able to detect various qualities of nodes in a mobile ad-hoc network as illustrated in FIG. 5, one can choose a protocol as illustrated at 70 for each portion of the ad-hoc network based on dynamicity to minimize overhead and maximize goodput/bandwidth utilization for the entire ad-hoc network to permit scaling to 1,000 nodes. For instance if one has a large number of static or quasi-static nodes one might use Protocol A which is a control routing transmission system as illustrated at 72. If, on the other hand, there are a number of nodes which are exhibiting high dynamicity, then in this situation a stateless flooding transmission 74—requiring no link update overhead—might be more appropriate than link-state routing which would require high-frequency link state updates.

Figure 6:
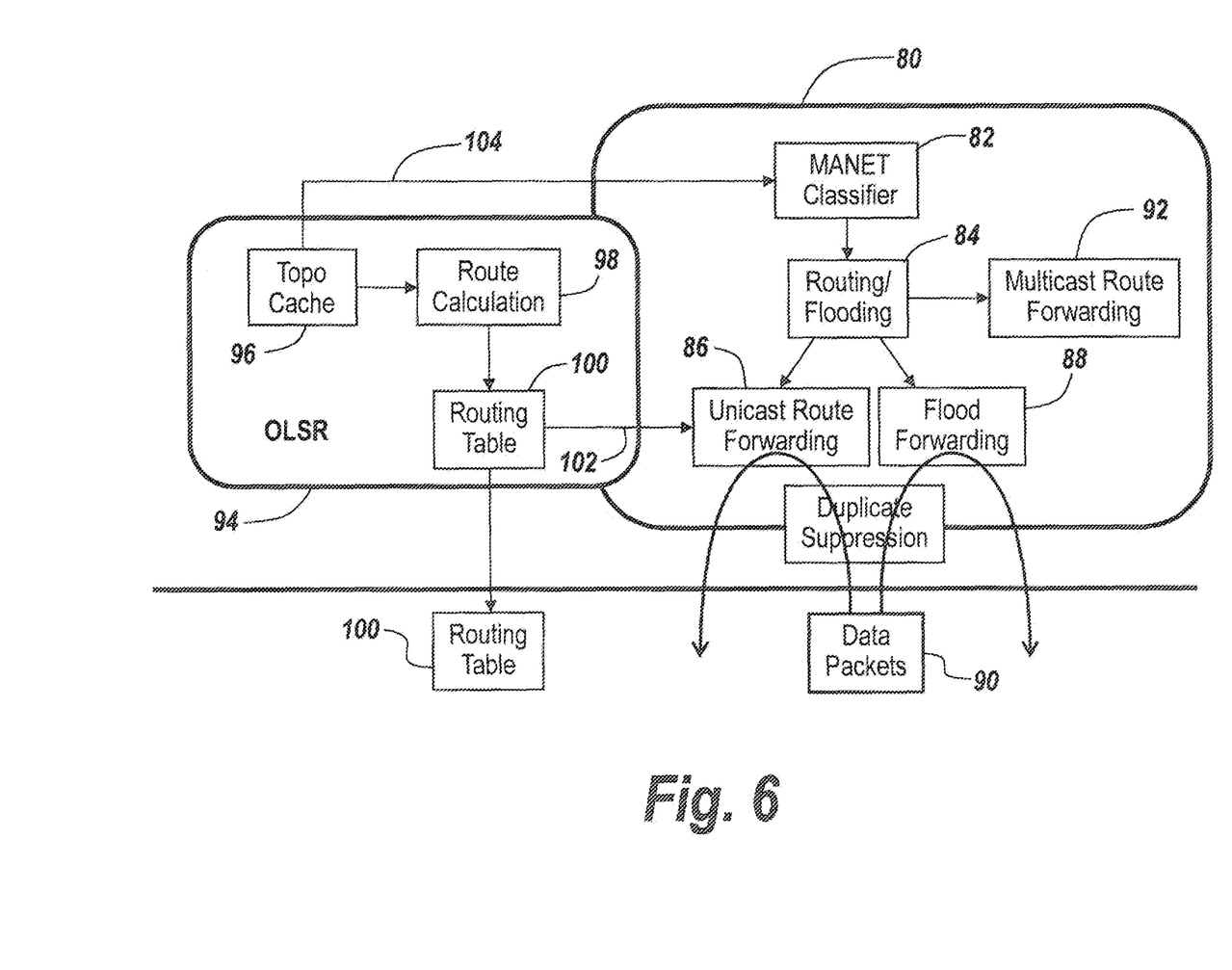
FIG. 6 is a schematic diagram illustrating the utilization of routing and forwarding based on the classification of the type of nodes involved in which optimized link state routing is utilized for unicast route forwarding whereas flooding is utilized for selected nodes.

How one selects between various protocols is shown in FIG. 6 in which a selection unit 80 includes a MANET classifier 82 which is able to classify the particular nodes due to the detection of a particular node parameter. This then can result in a selection of either routing or flooding as illustrated at 84 to institute a unicast route forwarding 86 or flood forwarding 88 of data packets 90 which are to be transmitted across the network. There is also a possibility of multicast route forwarding as illustrated at 92.

As to routing, and optimized link state routing module 94 includes a topo cache 96, a route calculation module 98 and a routing table 100 which is output to module 80 over line 102 such that the routing tables may be delivered to all of the appropriate nodes within the network. Note that the topo cache 96 information is delivered to MANET classifier 82 over line 104 which provides a means for measuring where the particular node is and how the node itself should be classified in terms of, for instance, a quasi-static state or a highly dynamic state.

In operation, the MANET system aims to address problems with scaling MANETs. The fixed wireless infrastructure can mitigate the inefficiency of long MANET paths and the routing and control overhead, but using it to relay all traffic is not possible, given its limited capacity. Moreover it will be appreciated that the subject system can select the data and control traffic with the highest utility to forward over the fixed wireless radio.

While MANETs exhibit high variations in user, topology and operational conditions, significant performance gains can be achieved if forwarding strategies are adapted to such conditions. It is a finding of the subject invention that the performance of nodes within a mobile ad-hoc network may be categorized as to the performance of state-full and state-less ad-hoc protocols in various network conditions. While links change frequently, link state signaling can overwhelm the network resulting in poor data plane performance. Hence flooding may become attractive in such situations. Conversely, when paths are stable, statefull MANET routing incurs relatively low overhead and delivers data more efficiently than flooding. For this reason statefull routing such as that is provided by OLSR is preferred.

A principle for the subject invention is to use multiple protocols simultaneously, each active in different parts of the network. Specifically the subject invention identifies the operating regime of each network region, maps each region to a particular forwarding protocol and activates that protocol in the corresponding network region. Thus, the subject invention utilizes the most efficient protocol for each network region providing an average network goodput higher than any single protocol controlling the entire network.

As described above, one way of distinguishing the operational characteristics of various nodes in a network is to focus on the local forwarding protocol in terms of the frequency of change of local topology. The subject system therefore defines a dynamicity metric to characterize the degree of change of a node's links at a given time $$\text{Dynamicity}(\text{node } i, \text{time } t) = \frac{\partial}{\partial t} \frac{\sum_j LQ_{i,j}(t)}{\sum_j 1_{LQ_{i,j}(t-1) > 0}}$$

where the link quality $LQ_{ij}(t)$ is the probability of successful transmission of packets from node i to node j in time t. Dynamicity measures the rate of change of total outbound link quality normalized by a number of neighbors in the previous epoch. Nodes with rapid changes in LQ are more likely to be suitable as flooders or multicast relays than as unicast routers.

In one embodiment classifier 82 is a distributed algorithm executed in each node. It gets its $LQ_{ij}t$ input from measurements performed by an OLSR instance running at that node. Given that OLSR reports link quality as a moving average of instant measurements effectively at time interval, the subject algorithm compensates by using the time derivative of the local dynamicity

|∂Dynamicity(n,t)/∂t| > τ → n's links are dynamic, where τ is a threshold depending on the frequency of link state measurements.

In one embodiment for nodes classified as dynamic the subject invention assigns a flood forwarding strategy. Otherwise it activates forwarding using shortest path routing.

This hybrid strategy enables the subject invention to provide network wide connectivity with low rate of link state updates. This low frequency is sufficient for accurate routing in non-dynamic regions, while flooding in dynamic regions avoids losses from incorrect paths. Note that in one embodiment the subject invention utilizes the typical update frequency of once every five seconds, which generates approximately 80 kB/s of control traffic in a network of 5,000 nodes. With an average neighborhood size of 4 links for node, the typical size of link state information is 12 bytes per link. This level of control traffic is less than 1 percent capacity of typical MANET radios and is thus not an issue for MANET scaling.

In one embodiment OLSR framework topologies are used in combining routing and flooding in the same system and using OLSR link quality calculations as inputs to the classifier permits classification of the various nodes within the mobile ad-hoc network. Once the classification decision is made, one of the forwarding strategies is activated and the data path is directed to that module. Shortest path routing is native to OLSR, whereas flooding is performed by simple multi-cast forwarding in a SMF plug-in.

The multitude of applications hosted by large MANETs of 100 to 5,000 nodes, requires service that can amount to 100 Mb/s to 10 Gb/s of aggregate user goodput. Forwarding all of this traffic over fixed wireless such as cellular networks that has a typical capacity of 10-50 Mb/s is not an option. The subject hybrid technology adopted here is to forward only the highest cost flows, namely longest hop paths using the most network TX per delivered packet over a fixed radio node, leaving the short path flows forwarded in the MANET. This strategy maximizes the efficiency of MANET forwarding as measured by the total transmission of packet delivered, average over all MANET traffic.

Figure 7:
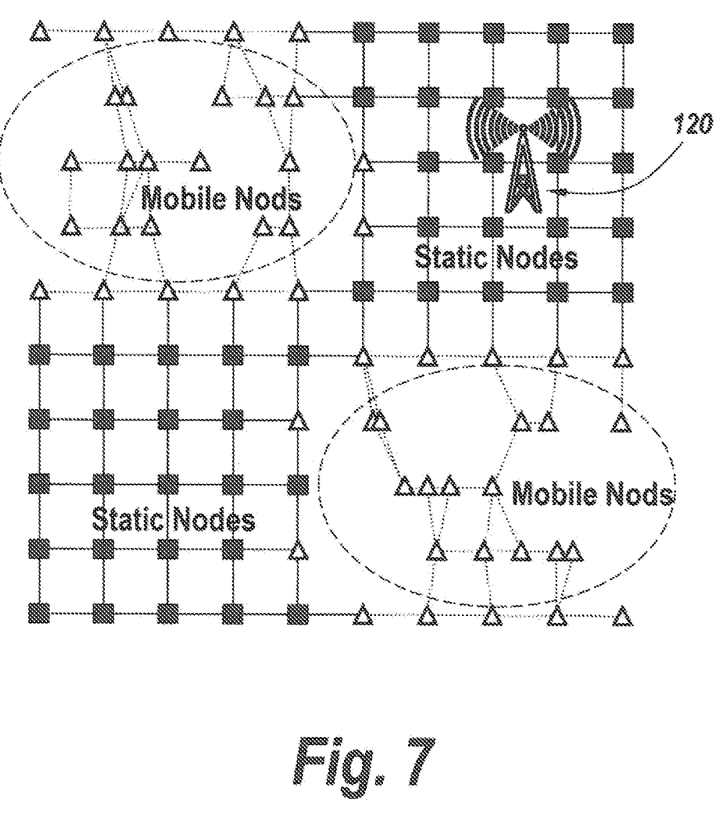
FIG. 7 is a diagrammatic illustration of using a specialized radio in a mobile ad-hoc network.
Figure 8:
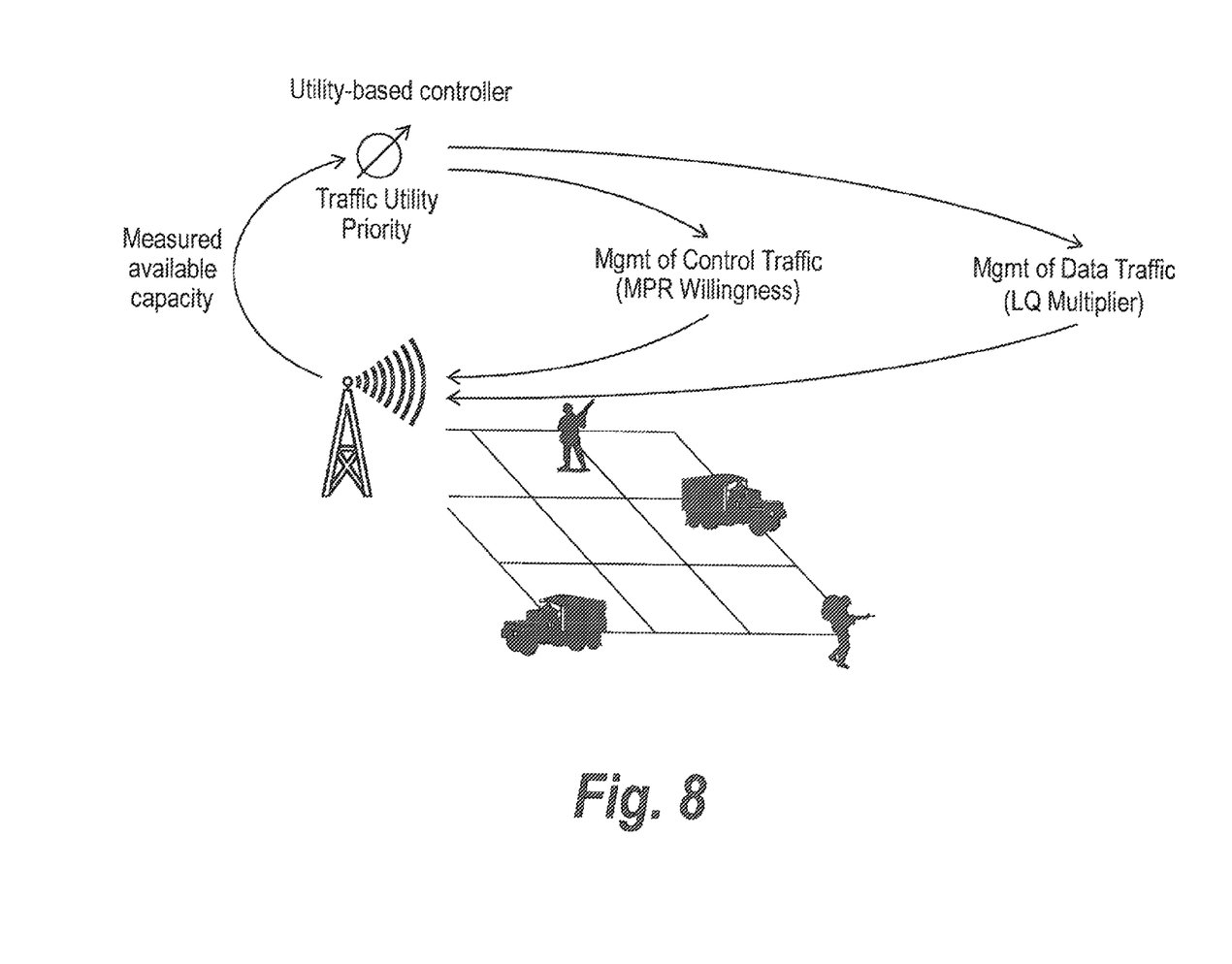
FIG. 8 is a design of mobile ad-hoc network traffic control over the fixed wireless radio.
Figure 9:
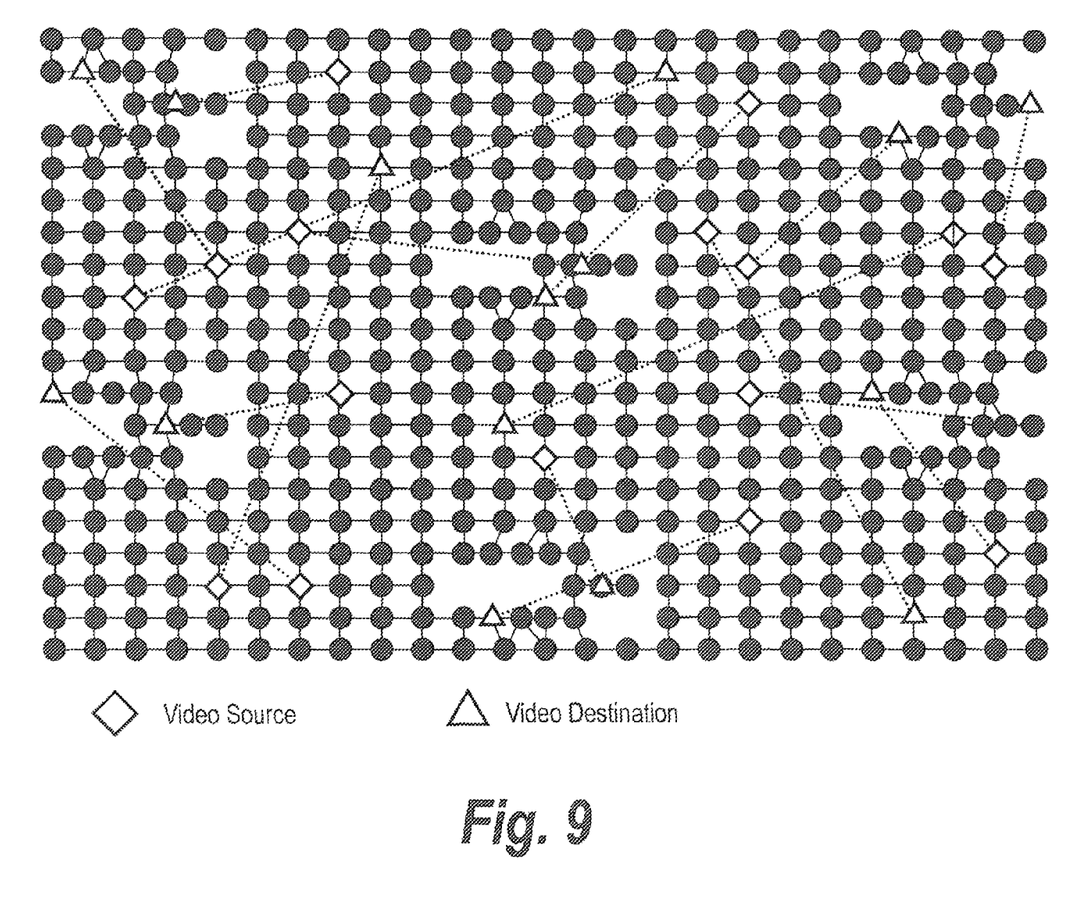
FIG. 9 is a 500-node network with diverse mobility and traffic.

As shown in FIG. 7, while the above has been described in terms of a mobile ad-hoc network involving selectable protocols, it will be appreciated that the aforementioned utilization of a specialized long range radio 120 may be effective in certain circumstances. It will be appreciated that control traffic, namely OLSR topology control messages containing link state updates can be steered to the be forwarded through fixed long range specialized radio 120. This strategy increases overall network efficiency if the fixed radio has some broadcast capability. For instance, in a network with N nodes, M neighbors per node, and F state updates per second, in a pure MANET without fixed infrastructure each node gets at least NMF bits/s and transmits the same, for a total of 2 NMF bits per node. If fixed wireless gets all link state updates and relays to all nodes via an omni broadcast, then each node gets the same NMF but only transmits MF bits per second for a total of (N+1)MF, a significant savings compared to the above.

Moreover if the specialized radio is directional with a certain beamwidth it needs S (=360 degree/beamwidth) transmissions to broadcast to all nodes. Still, each MANET node only requires (N+1)MF load, since only one out of S directional Tx occupies a channel.

Another benefit of using the fixed radio to broadcast control messages occurs in MANETs using CDMA radios with uncoordinated tx schedules, where losses due to hidden terminal collisions are common. In this case the short 2 hop dissemination of link state data is much more efficient than multi-hop flooding. In the subject invention involving specialized radios the invention assumes that the fixed radio has both directional and omni tx capability and thus steering control traffic through the fixed wireless is beneficial. It will be appreciated by adjusting the OLSR's MPR or multi-point relay willingness parameter to a high value for example a maximum value of 7, then the effect is that all OLSR in all other MANET nodes will direct the flooding of the tc messages to the MPR with the highest willingness, namely the fixed wireless node.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for increasing the number of nodes of a mobile ad-hoc network (MANET) comprising the steps of:
    dividing nodes of the MANET into categories related to an amount of overhead required by the nodes, wherein static nodes have a first overhead and dynamic nodes having a second overhead;
    determining the lesser overhead of the first overhead and the second overhead; and
    transmitting data via protocols associated with the lesser overhead of the first overhead and the second overhead.

2. The method of claim 1, wherein the protocols include routing protocols for the static nodes having the first overhead and flooding protocols for the dynamic nodes having the second overhead.

3. The method of claim 2, further comprising the steps of:
    servicing static nodes with routing protocols and servicing dynamic nodes with flooding protocols.

4. The method of claim 3, wherein some of the static nodes are quasi-static and are moveable but have a low dynamicity, wherein the static or quasi-static nodes have link list states that are updated at a slow rate and wherein the dynamic nodes having high dynamicity are serviced utilizing update rates that exceed those associated with the static or quasi-static nodes.

5. The method of claim 4, wherein the slow link state list updating occurs only every predetermined number of seconds such that the total bandwidth for the associated link state list updating occupies less than 2 percent of the total bandwidth of the mobile ad-hoc network.

6. The method of claim 5, wherein for rapid link state list updating the updating occurs rapidly such that the rapid link state list updating overhead occupies a large portion of the total bandwidth of the mobile ad-hoc network.

7. The method of claim 6, wherein the routing protocol includes a control routing protocol.

8. The method of claim 7, wherein the flooding protocol includes a stateless flooding to broadcast data to proximate nodes.

9. The method of claim 1, wherein prior to the step of dividing the nodes of the MANET includes the step of determining the dynamicity of the nodes, wherein the overhead is based at least in part on the dynamicity of the associated node, and wherein the step of transmitting data includes the step of selecting the protocol with a MANET classifier.

10. The method of claim 9, wherein the MANET classifier classifies nodes as to the dynamicity of a node.

11. The method of claim 10, further comprising the step of re-determining lesser of the first overhead and the second overhead, and switching protocols if the lesser overhead has changed.

12. The method of claim 11, wherein a routing/flooding module selectively activates a unicast route forwarding module or a flood forwarding module.

13. The method of claim 12, wherein the MANET classifier includes an input receiving information from the output of an optimized link state routing module.

14. The method of claim 13, wherein the optimized link state routing module includes a topographical cache coupled to the MANET classifier and also to a route calculation module in turn coupled to a routing table, the output of the routing table coupled to the unicast route forwarding module.

15. The method of claim 9, wherein the input to the MANET classifier includes a signal having information containing the dynamicity of a node; and further comprises the step of switching protocols to the most advantageous protocol that minimizes overhead.

16. The method of claim 15, wherein the dynamicity of a node is determined from a topological cache in an optimized link state routing module and if the topological cache indicates the node is static, then switching to low frequency list updates maintained by the link state routing module.

17. The method of claim 1, and further including a specialized radio located within the mobile ad-hoc network area, the specialized radio having sufficient power output to reach a majority of the nodes in the mobile ad-hoc network.

18. The method of claim 17, wherein the specialized radio includes a directional antenna.

19. The method of claim 18, wherein the directional antenna is made to sweep large areas within the mobile ad-hoc network and has a privilege when transmission requires more than 20 hops between nodes.

20. The method of claim 17, wherein the specialized radio is selectively provided with data to be transmitted over the mobile ad-hoc network in accordance with pre-selected criteria.

21. The method of claim 20, wherein the pre-selected criteria includes importance of communication of the data.

22. The method of claim 1, wherein the selection of important data is accomplished irrespective of the bandwidth of the important data.

23. A system for selecting between link state list update rates based upon the dynamicity of nodes with in the mobile ad-hoc network, wherein the dynamicity of nodes is based on node overhead and irrespective of connection type between the nodes.

24. The system of claim 23, wherein update rates for nodes having low dynamicity are lower than for high dynamicity nodes, and the Said system selecting low update rates for low dynamicity nodes.

25. The system of claim 24, wherein the bandwidth freed up by the ability to slowly update nodes with low dynamicity permits an increase in the number of nodes serviceable by the mobile ad-hoc network.

26. The system of claim 25, wherein low dynamicity nodes are serviced by routing protocols.

27. The system of claim 26, wherein high dynamicity nodes are serviced by flooding protocols.

* * * * *